United States Patent

[11] 3,568,844

| [72] | Inventors | Robert J. Coffelt<br>Sacramento;<br>George R. Giannini, Davis, Calif. |
|---|---|---|
| [21] | Appl. No. | 836,018 |
| [22] | Filed | June 24, 1969 |
| [45] | Patented | Mar. 9, 1971 |
| [73] | Assignee | The Regents of the University of California<br>Berkeley, Calif. |

[54] MACHINE FOR SEPARATING JUICE FROM CRUSHED GRAPES
6 Claims, 6 Drawing Figs.

[52] U.S. Cl. .................................................. 210/327,
210/396
[51] Int. Cl. .............................................. B01d 33/24
[50] Field of Search.......................................... 210/324,
344, 406, 396, 397, 359, 304, 391, 413—415, 327;
209/332

[56] References Cited
UNITED STATES PATENTS
| 3,047,151 | 7/1962 | Hurst.......................... | 209/332X |
| 3,217,561 | 11/1965 | Allgaier et al. ............... | 209/332X |

*Primary Examiner*—J. L. DeCesare
*Attorney*—Lothrop and West

ABSTRACT: A machine separates juice from crushed grapes by receiving the crushed grapes on a perforated table revolving on a frame relative to a spiral wall supported by the frame close to the table. The wall may be moved laterally relative to the table. The juice is caught beneath the table and the pomace is discharged. The pomace can be further treated on one or more subsequent, similar table and spiral wall unit or units.

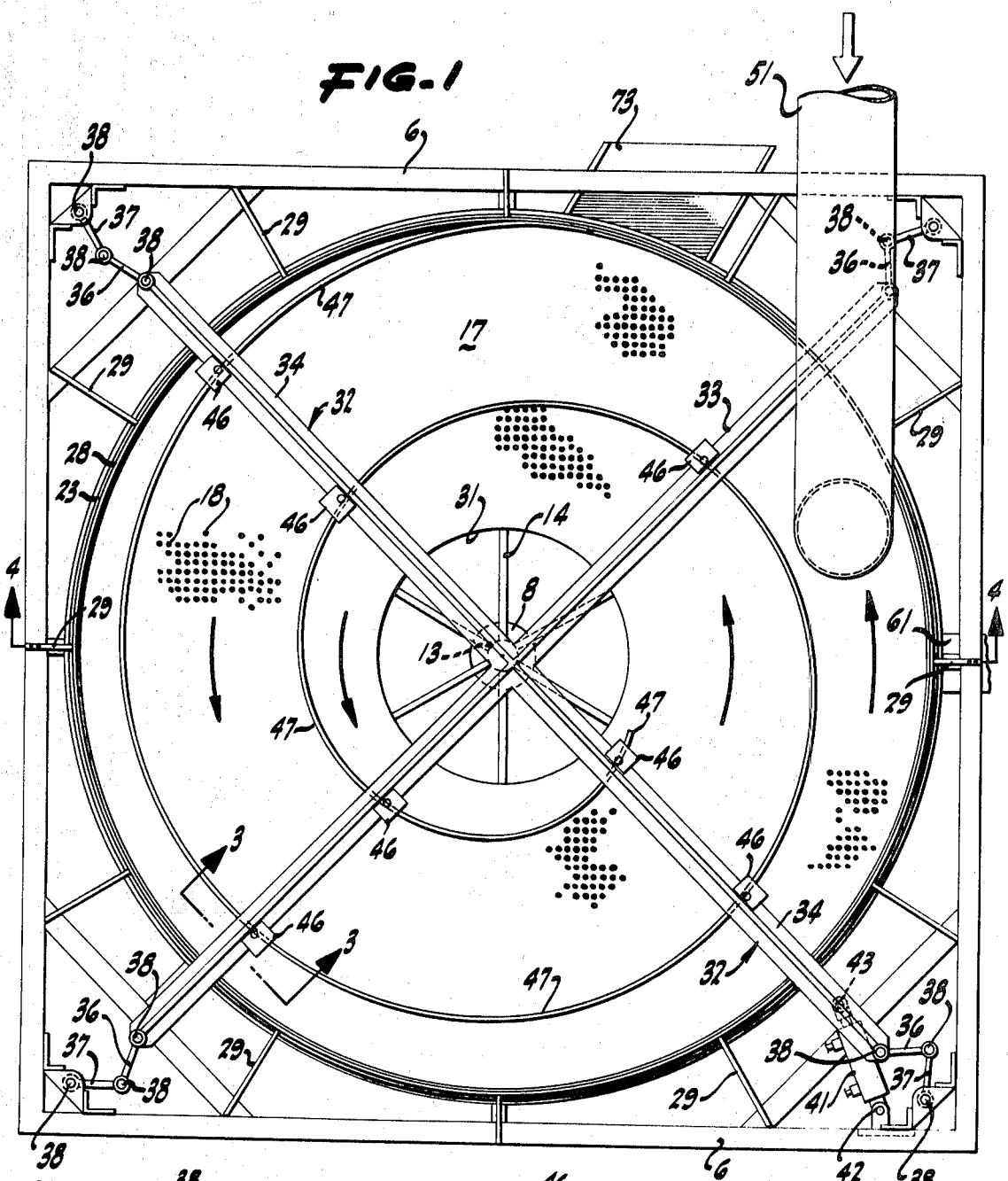

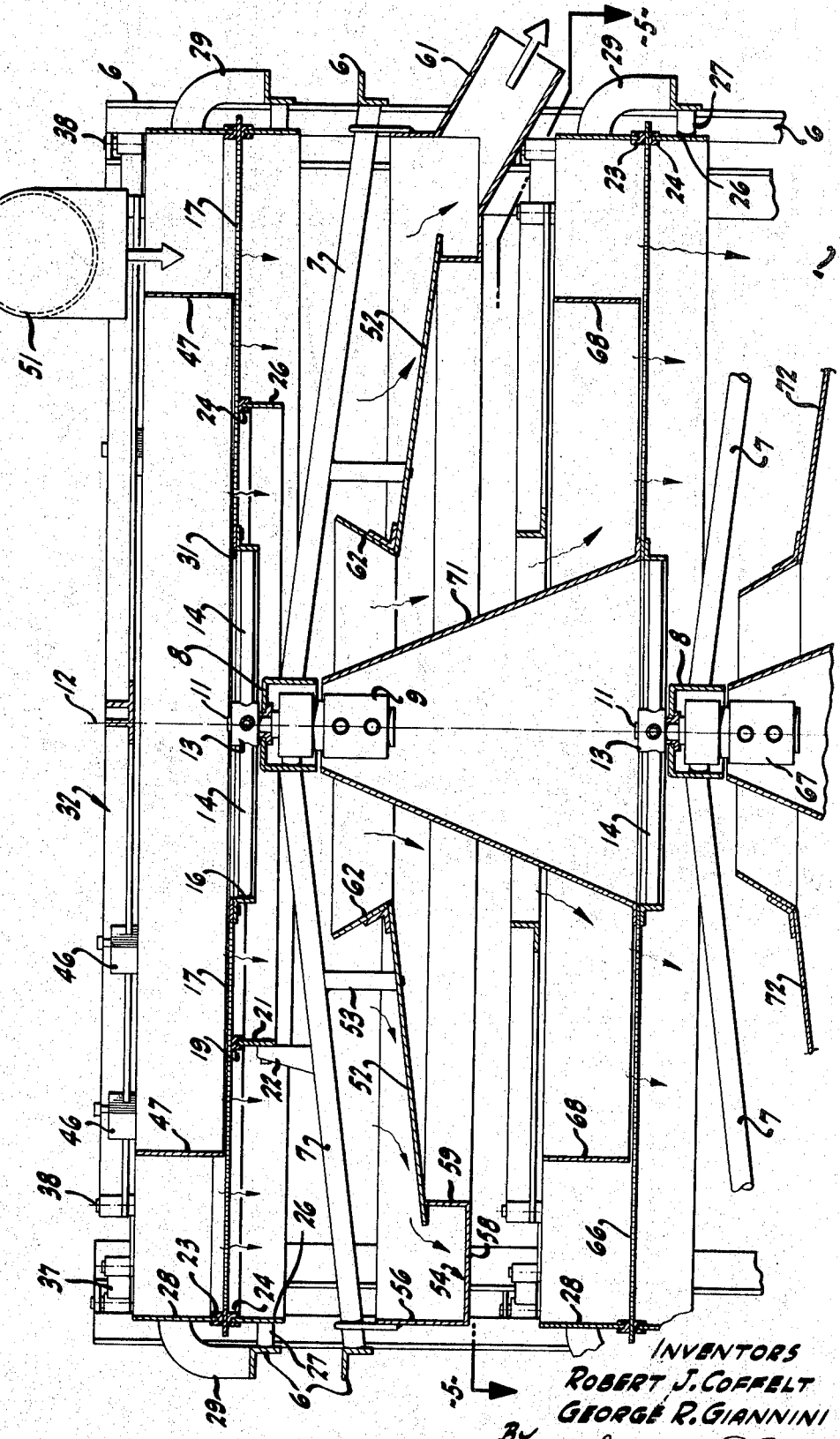

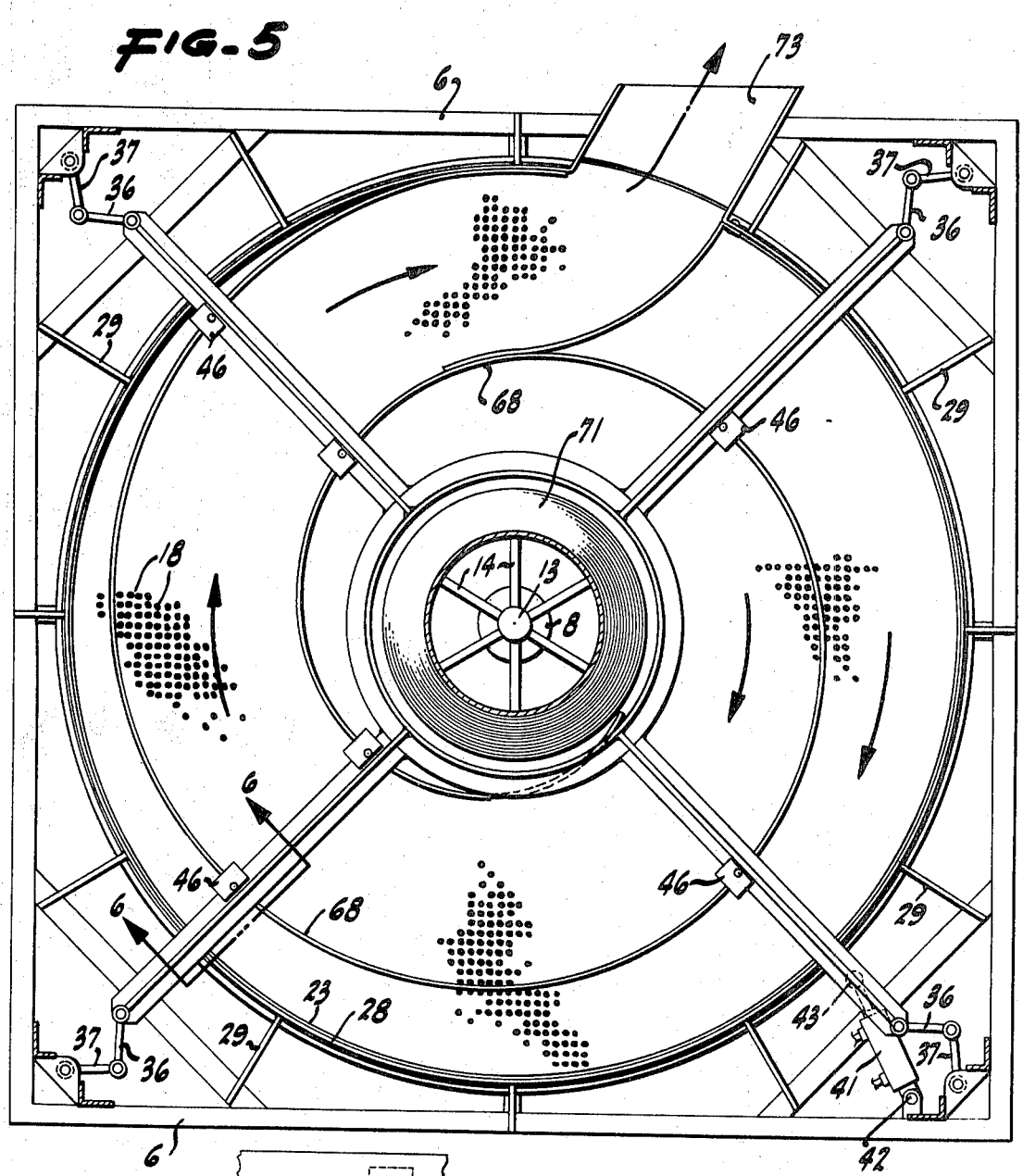
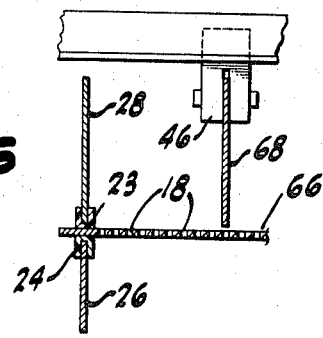
INVENTORS
ROBERT J. COFFELT
GEORGE R. GIANNINI
BY Lothrop & West
ATTORNEYS

MACHINE FOR SEPARATING JUICE FROM CRUSHED GRAPES

In the recovery of grape juice from grapes, either for its own sake or for the production of wine, various means are taken to separate the juice from the grapes after crushing. These are effective to different degrees in extracting the juice and are effective to afford a reasonable separation. In many instances, however, the devices employed either occupy a great deal of room, are difficult to maintain in a clean and sanitary condition, require a great deal of power or otherwise have difficulties which render their use not as efficient and effective as desired.

It is therefore an object of the invention to provide a machine for separating juice from crushed grapes which overcomes the mentioned deficiencies and which is generally an improvement in the field.

Another object of the invention is to provide a machine which can handle a large quantity of crushed grapes with ease and with excellent separation of the juice from the remaining pomace.

Another object of the invention is to provide a separating machine requiring but little power for its operation.

A further object of the invention is to provide a separating machine which is readily inspected and cleaned and can be maintained in a sanitary and clean condition without difficulty.

A further object of the invention is to provide a separating machine which will handle a large volume of material yet which will occupy but a small amount of floor space.

An additional object of the invention is to provide a machine for continuous operation.

Other objects, together with the foregoing, are attained in the embodiment of the invention described in the accompanying description and illustrated in the accompanying drawings, in which:

FIG. 1 is a plan of a machine for separating juice from crushed grapes;

FIG. 2 is a detail showing in side elevation a portion of a linkage mechanism at a corner of the structure;

FIG. 3 is a cross section, the plane of which is indicated by the line 3-3 of FIG. 1;

FIG. 4 is a cross section, the plane of which is indicated by the line 4-4 of FIG. 1;

FIG. 5 is a cross section, the plane of which is indicated by the line of 5-5 of FIG. 4; and FIG. 6 is a detailed cross section, the plane of which is indicated by the line 6-6 of FIG. 5.

As particularly illustrated in FIGS. 1 and 4, the machine is inclusive of a framework 6 adapted to stand on any appropriate support such as a level floor. Included in the frame are supporting arms 7 extending from the sides of the frame toward the center thereof where they meet to hold a housing 8. Located within the housing is a hydraulically actuated motor 9 supporting and revolving a central shaft 11 so that the shaft rotates with respect to the frame about a vertical axis 12. At the upper end of the shaft 11 a hub 13 with radial arms 14 serves as a mounting for a ring 16 connected to a generally planar rotating table 17.

The table is preferably fabricated of a metal or plastic stainless steel having excellent sanitary qualities and having sufficient friction to propel superposed material. The table throughout its entire area or most of its area is provided with a number of through perforations 18. In effect, the table is a disclike screen.

The outer margin of the table preferably runs between a pair of annular shoes 23 and 24. The lower shoe is the cap for an annular band 26 secured to parts of the frame 6 by intervening struts 27. The upper shoe 23 is on an annular wall 28 at appropriate intervals supported by brackets 29 on the framework 6.

With this arrangement the table 17 is held in a generally horizontal plane, is supported not only at its central portion but at intervening portions and at its margin. The table is provided with a central opening 31 so that the table is actually of annular form.

Arranged also on the framework 6 is a frame 32 comprised of various metal shapes having substantially an X form approximately centered on the axis 12. The frame 32 can be directly connected to the framework 6 or it can be movable with regard thereto. For movement the frame 32 is preferably provided at the ends of its various crossarms 33 and 34 with double links 36 and 37 connected by pivots 38. The frame 32 is thus readily movable in a single horizontal plane and into any one of various locations with respect to the axis 12.

The movement of the frame 32 can readily be effectuated by a hydraulically driven jack 41 having one end connected by a pivot 42 to the framework 6 and having one end connected by a pivot 42 to the framework 6 and having the other end connected by a pivot 43 to one of the crossarms 34. When the hydraulic jack 41 is energized the frame 32 is moved in a generally lateral or transverse direction with respect to the framework 6. When the jack 41 is not moved or when the linkages 36 and 37 are made immobile, then the frame 32 is stationary with respect to the framework 6 and in the latter case is usually centered on the axis 12.

Depending from the frame 32 by means of a number of clips 46 (FIG. 3) is a spiral wall 47. This is preferably a vertically arranged, originally flat strip of inert plastic material which has one end disposed very close to the wall 28 and then is arranged in a spirally configured shape to wind in toward the center opening 31 of the table. The spiral wall makes approximately two revolutions in extending from the outer wall 28 to the opening 31. The spiral wall is positioned from the top and extends down to and comes into light supporting engagement with the upper surface of the rotating table.

With this structure there can be effectuated good separation of the juice from the pomace of crushed grapes. The grapes after crushing are supplied through an inlet duct 51 (FIG. 1) which discharges in a convenient, outer location onto the upper surface of the table. As the table is revolved by the motor 9 the arriving crushed grapes are carried along over the table surface. Juice contained in the crushed grapes tends to drain by gravity through the various perforations. As the table revolves the oncoming crushed grapes are moved by the spiral wall 47 in a generally radially inward direction.

The movement of the crushed grapes circumferentially and radially over the table tends to roll and rearrange the crushed grape masses so that the juice has an excellent chance to escape therefrom and drain through the table. Ultimately, the advancing crushed grapes arrive at the central opening 31 and are gradually swept over the edge thereof to fall through the opening over the arms 14 and to continue below the table.

It has been found with some loads of crushed grapes that it is highly beneficial to operate the hydraulic jack 41 in a vibratory fashion so that the spiral wall continually makes transverse or lateral motions in order further to agitate and tumble the crushed grapes and to assist in the separation of juice therefrom. In other instances however, the juice is released from the crushed grape mass readily enough so that it is not essential to operate the jack 41 as an agitator. In that instance the frame 32 and the spiral wall remain stationary.

The juice released from the grapes on the table after falling therethrough likewise falls onto a inverted conical deflector 52 supported on the frame arms 7 by brackets 53. The deflector extends outwardly and downwardly to a trough 54 having an outer sidewall 56 supported from the frame arms 7 and having a bottom wall 58 as well as an inner sidewall 59. The trough 54 is of annular configuration, extending entirely around the machine and gives onto a discharge duct 61 from which the juice flows for further handling.

The pomace, which remains after the juice has been released, falls through the central opening 31 and is received in a conical deflector 62, likewise supported on the framework 6 and leading preferably to a subjacent unit. In some instances the discharge from the cone 62 can be directly to a conveyor carrying away the spent pomace, but in many instances it is found that a subsequent stage or stages of separation are beneficial. Consequently, we provide on the framework 6 a similar revolving table 66 driven by a supplemental hydraulic motor 67, the table construction being as previously described.

The table 66 is associated with a second spiral wall 68, the only distinction being that the spiral wall 68 winds from the center outwardly rather than from the outside inwardly as is the case with the wall 47. The pomace with some entrained juice discharged through the deflector 62 is guided by a cone 71 onto the interior portion of the lower table 66 and since that table is revolved in an appropriate direction by the motor 67, the pomace is then moved outwardly.

Juice which separates in the second step falls by gravity onto a conical deflector 72 leading to a discharge trough, not shown, but similar to the trough 54, and in turn leading to a spout discharging from the machine. The pomace, discharged from the second separating step, flows through an outlet spout 73 (FIG. 5). In some cases the discharge from the spout 73 is actually onto another subjacent table so that a third separating stage is afforded. In fact, any number of separating stages can be employed, although in most instances only two are required.

Except for the direction of rotation of the table or except for the direction of winding of the spiral, the individual stages are identical one with the other. The tables, however, can be rotated at individual speeds since each is preferably provided with its own drive motor. However, if the spiral walls are properly arranged a single drive shaft and single motor can be utilized.

It has been found in practice with this arrangement that large quantities of crushed grapes can be received and can have the juice extracted in a device which occupies very little floor space and which is readily open to observation and inspection and all parts of which are easily cleaned after use and maintained in a sanitary condition. The amount of power required to revolve the table or tables and to propel the crushed grapes from the inlet to the outlet is surprisingly small, yet the recovery of juice or the separation of juice from the final pomace is a large fraction of that available.

For explanation purposes, the disclosure has referred to grapes and grape juice as the materials handled and the device has had successful application in that field, but there are also many other materials with which the machine is useful. For example, in separating metal chips from coolant oil both the conveying and separating functions can readily be effected. If only conveying is needed, say in advancing a product to be frozen, the device can be disposed in a cold atmosphere or stream and the product as it advances is thoroughly subjected to a heat transferring action. Product heating can be similarly accomplished. Thus the device is suitable for the function of conveying and for the function of exposing the product surface to the environment with ready flow of gas or liquid through the table surface.

We claim:

1. A machine for separating juice from crushed grapes comprising a frame, a perforate table on said frame, a spiral wall on said frame, means on said frame for rotating said wall and said table relative to each other, means for supplying said table adjacent one end of said wall with crushed grapes, and means on said frame beneath said table for receiving juice passing through said table.

2. A machine as in claim 1 including means for moving said table and said wall laterally relative to each other.

3. A machine as in claim 1 including means centrally of said table for releasing crushed grapes therefrom.

4. A machine as in claim 1 including a second perforate table on said frame below said table, a second spiral wall on said frame adjacent said second table, means on said frame for rotating said second table and said second spiral wall relative to each other, and means for releasing crushed grapes from said table to said second table.

5. A machine as in claim 1 including a peripheral wall on said frame in substantially liquid tight engagement with the top of said table.

6. A machine as in claim 1 in which said rotating means includes a motor disposed centrally on said frame and connected to said table by a shaft mounted centrally on said frame to turn about a vertical axis.